W. H. DAGGETT.
BREAD PAN
No. 109,875. 
Patented Dec. 6, 1870.
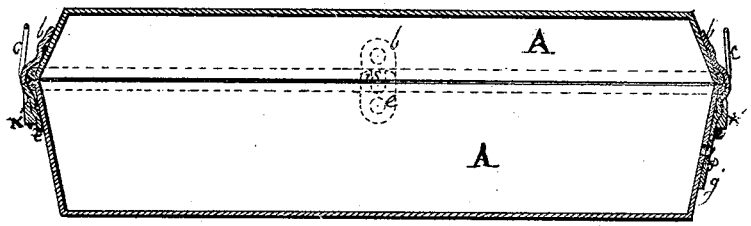
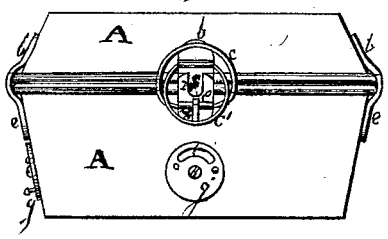
Witnesses
Jno. A. Ellis
C. Allyanoer
Inventor
Wm A. Daggett
Per
T. H. Alexander
Atty.

United States Patent Office.

WILLIAM A. DAGGETT, OF SOUTH VINELAND, NEW JERSEY.

Letters Patent No. 109,875, dated December 6, 1870.

IMPROVEMENT IN BREAD-PANS.

The Schedule referred to in these Letters Patent and making part of the same.

*To all whom it may concern:*

Be it known that I, WILLIAM A. DAGGETT, of South Vineland, in the county of Cumberland and State of New Jersey, have invented certain new and useful Improvements in Bread-Pans; and I do hereby declare that the following is a full, clear, and exact description thereof, reference being had to the accompanying drawing and to the letters of reference marked thereon which form a part of this specification, in which—

Figure 1 is a central longitudinal section of a dough-pan.

Figure 2 is an end view of the same.

The nature of my invention consists in the construction of a pan for raising dough in the manner set forth.

In the annexed drawing—

A represents the dough-pan, and

A', the adjustable top or cover, which consists of a pan inverted, with its edges resting on the edges of pan A.

On the opposite ends, and at the center of A, are soldered the plates $e$, the said plates extending a little above the edge of the pan, and having an opening, I, in them, the object of which will be hereafter explained.

Each of the plates $e$ will have a groove at its inner side, for the purpose of receiving a ring, C.

The top A' has also two metal plates, $b$, soldered to it, corresponding in position to those on A, the said plates having at their lower end a tongue, $s$, which extends downward and enters the openings I.

The object of this arrangement is to prevent the top A from moving sidewise.

A lateral groove is made at the inner surface of plates $b$, for receiving the rings C'.

In the dough-pan A two vent-openings, $t$, are made, one being at the side and the other at the end of A.

Over the said holes or openings are pivoted the metal lids $g$, which have, near their top, openings corresponding with the openings $t$.

The object of openings $t$ is to vent any water that may not have been absorbed by the dough.

As soon as the dough has risen above the point of contact of the top A' and pan A, the vents $t$ can be covered by the lids $g$, and the air excluded from the bread-pan A.

In order to prevent the top A' from moving endwise, the rings C will be brought down, and its lower circumference pressed under the projection $x$ on plate $e$, thus holding the top A' firmly in position.

When the top A' and pan A are separated, their respective rings can be used as handles.

One great advantage I claim in the construction of my bread-pan is the excluding the air from the dough while in process of rising, and thus preventing the acetous fermentation, so fatal to bread in warm weather; for it can be seen that the pan A, being filled with dough, the moment said dough begins to rise it closes the seam between pan A and top A', and renders the introduction of air impossible.

Having thus described my invention,

What I claim, and desire to secure by Letters Patent, is—

1. The bread-pan A, in combination with the top A', when furnished with their respective plates $b$ and $e$, in the manner and for the purpose substantially as set forth.

2. The plates $b$, when supplied with rings C and tongues $s$, in combination with plates $e$, when constructed with openings I and projections $x$, the whole constructed and operating substantially as specified.

In testimony that I claim the foregoing as my own, I affix my signature in presence of two witnesses.

WILLIAM A. DAGGETT.

Witnesses:
R. C. SYKES,
WM. H. GILL, Jr.